United States Patent [19]

Ri et al.

[11] Patent Number: 5,555,514
[45] Date of Patent: Sep. 10, 1996

[54] METHOD OF AND APPARATUS FOR GENERATING DOPPLER SOUNDS

[75] Inventors: Taiho Ri; Hiroshi Hashimoto, both of Tokyo, Japan

[73] Assignee: GE Yokogawa Medical Systems, Limited, Tokyo, Japan

[21] Appl. No.: 367,243

[22] PCT Filed: Jul. 15, 1993

[86] PCT No.: PCT/JP93/00985

§ 371 Date: Jan. 3, 1995

§ 102(e) Date: Jan. 3, 1995

[87] PCT Pub. No.: WO94/02070

PCT Pub. Date: Feb. 3, 1994

[30] Foreign Application Priority Data

Jul. 20, 1992 [JP] Japan .................................. 4-191922

[51] Int. Cl.$^6$ .............................. G01S 7/32; G01S 7/292
[52] U.S. Cl. ..................... 364/604; 364/577; 128/661.09
[58] Field of Search ................................. 364/578, 807, 364/577, 579, 604; 128/660.01, 661.09, 661.01, 661.07, 661.08, 661.09; 73/625–626, 597

[56] References Cited

U.S. PATENT DOCUMENTS

| | | | |
|---|---|---|---|
| 3,825,737 | 7/1974 | Croisier | 235/186 |
| 4,509,525 | 4/1985 | Seo | 128/663 |
| 4,604,697 | 8/1986 | Luthra et al. | 364/414 |
| 4,817,617 | 4/1989 | Takeuchi et al. | 128/660.05 |
| 4,886,069 | 12/1989 | O'Donnell | 128/661.01 |
| 4,888,557 | 12/1989 | Puckette, IV et al. | 329/341 |
| 4,894,795 | 1/1990 | Whitehouse et al. | 364/807 |
| 4,983,970 | 1/1991 | O'Donnell et al. | 341/122 |
| 5,083,567 | 1/1992 | Uchibori | 128/661.09 |
| 5,228,009 | 7/1993 | Forestieri et al. | 367/135 |
| 5,230,340 | 7/1993 | Rhyne | 128/661.01 |
| 5,249,548 | 10/1993 | Karp et al. | 128/661.01 |
| 5,251,631 | 10/1993 | Tsuchiko et al. | 128/661.01 |
| 5,268,877 | 12/1993 | Odell | 367/103 |
| 5,293,247 | 3/1994 | Ganse | 358/328 |
| 5,322,066 | 6/1994 | Miyataka et al. | 128/660.04 |

OTHER PUBLICATIONS

Brumley et al., "Performance of a broadband Acoustic Doppler Current Profiler," IEEE, pp. 402–407, 1991.
Tortoli et al., "Experimental Proof of Doppler Bandwidth Invariance," IEEE, pp. 196–203, 1992.
Newhouse et al., "Study of Vector Flow Estimation with Transverse Doppler "IEEE, pp. 1259–1265, 1991.

*Primary Examiner*—Kevin J. Teska
*Assistant Examiner*—Thai Phan
*Attorney, Agent, or Firm*—Kojima Moonray

[57] ABSTRACT

Method and apparatus for generating Doppler sounds, even when there are segmented Doppler modes, wherein I and Q components of a Doppler signal are respectively converted into left and right sound signals in accordance with Hilbert transformation, then, a segmented waveform, interposed between zero crossing points of the left and right sound signals, is take out so as to created a positive side segmented waveform, obtained by rendering the sign of the segmented waveform positive, and so as to create a negative side segmented waveform, obtained by rendering the sign of the segmented waveform negative, then, respective pairs of positive side segmented waveforms and negative side segmented waveforms of respective segmented waveforms are made continuous in order of appearance of the segmented waveforms so as to create double lengthened sound signals which are then joined to produce a continuous sound signal.

10 Claims, 6 Drawing Sheets

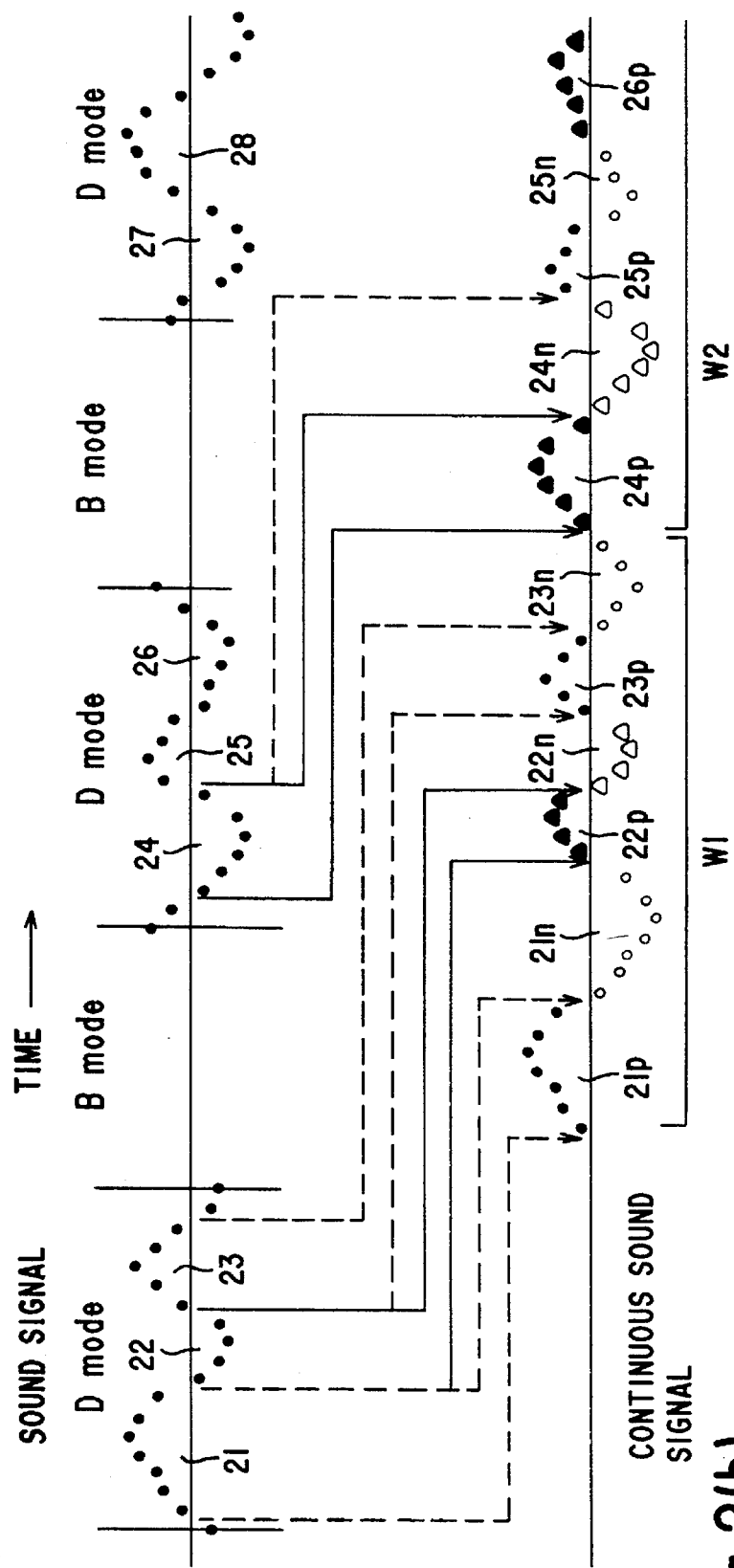

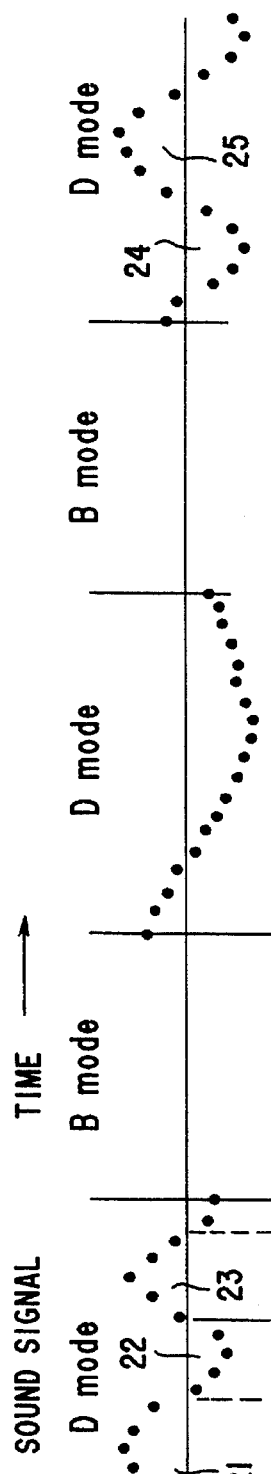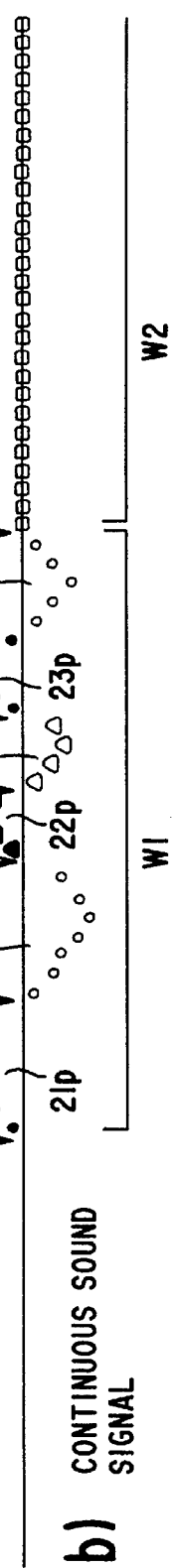

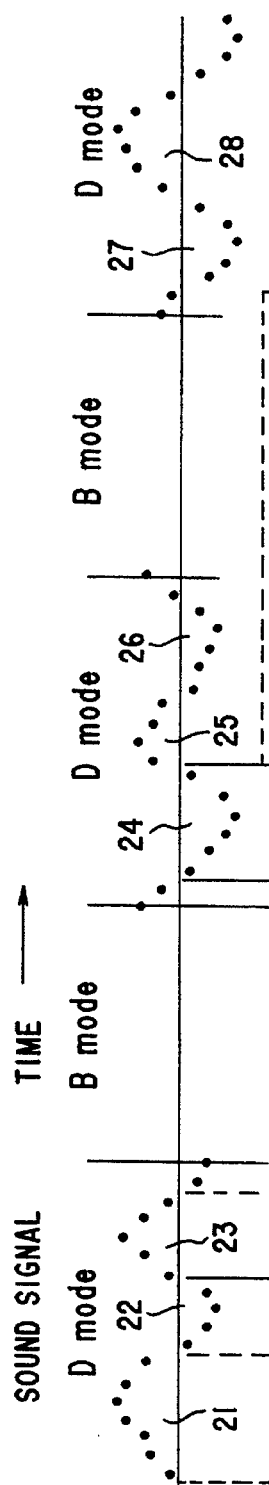
Fig.5(a)
Fig.5(b)

METHOD OF AND APPARATUS FOR GENERATING DOPPLER SOUNDS

TECHNICAL FIELD

The present invention relates to a method of and an apparatus for generating Doppler sounds, and more specifically to a method of and an apparatus for generating Doppler sounds, wherein natural Doppler sounds can be generated even upon segmented Doppler modes (each corresponding to a mode in which a pulse Doppler mode and a B mode are alternately performed).

BACKGROUND ART

In each of segmented Doppler modes, a pulse Doppler mode (D mode) of 20 ms, for example and a B mode of 17 ms, for example are alternately executed as shown in FIG. 6(a). Therefore, Doppler sounds are rendered intermittent. As a result, the Doppler sounds are hard to be used in diagnosis if they are kept intact.

It has therefore been proposed a technique wherein Doppler signals produced during D mode periods are joined to one another and Doppler signals produced during B mode periods immediately after the D modes periods are created to thereby make Doppler sounds continuous as shown in FIG. 6(b). If joints between adjacent waveforms are discontinuous, then trickling sounds are heard so as to offend the ear. Therefore, windows are effected on the joints so as to smooth the Doppler signals.

As another prior art, there has been known one in which signal correlation characteristics are determined from Doppler signals produced during D mode periods, a coefficient of an FIR filter (Finite Impulse Repeat filter) is decided and random data is inputted to the FIR filter to thereby create Doppler signals to be used during B mode periods immediately after the D mode periods and to smoothly join the created Doppler signals to the Doppler signals before and after the created Doppler signals under the action of windows so that Doppler sounds are rendered consecutive.

As a further prior art, there has been known one in which power spectrums of Doppler signals produced during D mode periods existing before and after B mode periods are determined, power spectrums for the B mode periods are determined by linear interpolation of both power spectrums and random phases are given to the power spectrums to thereby create Doppler signals to be used during the B mode periods and to smoothly join the created Doppler signals to the Doppler signals before and after the created Doppler signals under the action of windows so that Doppler sounds are rendered continuous.

The above prior arts are accompanied by problems that although the Doppler signals to be used during the B mode periods are created and thereafter smoothly joined to the Doppler signals existing before and after the created Doppler signals under the execution of the windows, a change in sound quality occurs when the windows are effected. Further, a problem arises that the decision oft the FIR filter coefficient and the determination of the linear interpolation of the power spectrums provide a complex structure.

DISCLOSURE OF THE INVENTION

It is therefore an object of the present invention to provide a method of and an apparatus for generating Doppler sounds, wherein natural Doppler sounds can be produced even upon segmented Doppler modes in a simple structure.

According to a first aspect of the present invention, for achieving the above object, there is provided a method of generating Doppler sounds, wherein each of pulse Doppler modes is intermitted for a predetermined time interval to insert a B mode, thereby effecting each of segmented Doppler modes in concurrence with the pulse Doppler mode and the B mode, comprising the following steps: a step for converting I and Q components of a Doppler signal obtained in the pulse Doppler mode into right and left sound signals respectively, a step for taking out segmented waveforms interposed between zero cross points of the right and left sound signals produced during a single pulse Doppler mode period so as to create positive-side segmented waveforms obtained by rendering the signs of the segmented waveforms positive and negative-side segmented waveforms obtained by rendering the signs of the segmented waveforms negative, making respective pairs of the positive-side segmented waveforms and the negative-side segmented waveforms of the respective segmented waveforms continuous in order of appearance of the segmented waveforms so as to create double-lengthened right and left sound signals and making the created respective double-lengthened right and left sound signals produced during the respective pulse Doppler mode periods continuous so as to create continuous right and left sound signals, and a step for producing the Doppler sounds based on the continuous right and left sound signals.

According to a second aspect of the present invention, there is provided a method of generating Doppler sounds, wherein each of pulse Doppler modes is intermitted for a predetermined time interval to insert a B mode, thereby effecting each of segmented Doppler modes in concurrence with the pulse Doppler mode and the B mode, comprising the following steps: a step for converting I and Q components of a Doppler signal obtained in the pulse Doppler mode into right and left sound signals respectively, a step for taking out segmented waveforms interposed between zero cross points of the right and left sound signals produced during a single pulse Doppler mode so as to create positive-side segmented waveforms obtained by rendering the signs of the segmented waveforms positive and negative-side reverse segmented waveforms obtained by rendering the signs of the segmented waveforms negative and reversing the intervals before and after each time or time interval, making respective pairs of the positive-side segmented waveforms and the negative-side reverse segmented waveforms of the respective segmented waveforms continuous in order of appearance of the segmented waveforms so as to create double-lengthened right and left sound signals and making the double-lengthened right and left sound signals produced during the respective pulse Doppler mode periods continuous so as to create continuous right and left sound signals, and a step for producing the Doppler sounds based on the continuous right and left sound signals.

In the Doppler sound generating methods according to the first and second aspects, each of the double-lengthened sound signals normally reaches a time interval less than substantially twice the pulse Doppler mode period. Thus, if each of the B mode periods is slightly shorter than the pulse Doppler mode period, each B mode period can be interpolated. Therefore, if the double-lengthened sound signals produced during the respective pulse Doppler mode periods are joined to one another, the continuous sound signal can be obtained. Since the respective segmented waveforms are joined to one another at the zero points, practically problem-free continuity can be obtained even if the windows are not run. Namely, natural Doppler sounds can be produced in a simple structure.

BRIEF DESCRIPTION OF THE DRAWINGS

FIG. 2 is a view for describing the sequence of sound signals generated from the apparatus shown in FIG. 1;

FIG. 3 is a view for describing another sequence of the sound signals generated from the apparatus shown in FIG. 1;

FIG. 5 is a view corresponding to FIG. 2 showing the sequence of sound signals generated from an apparatus for generating Doppler sounds, according to another embodiment of the present invention.

BEST MODE FOR CARRYING OUT THE INVENTION

The present invention will hereinafter be described in further detail by preferred embodiments shown in the accompanying drawings. The present invention is not necessarily limited to the embodiments.

Figure 1:
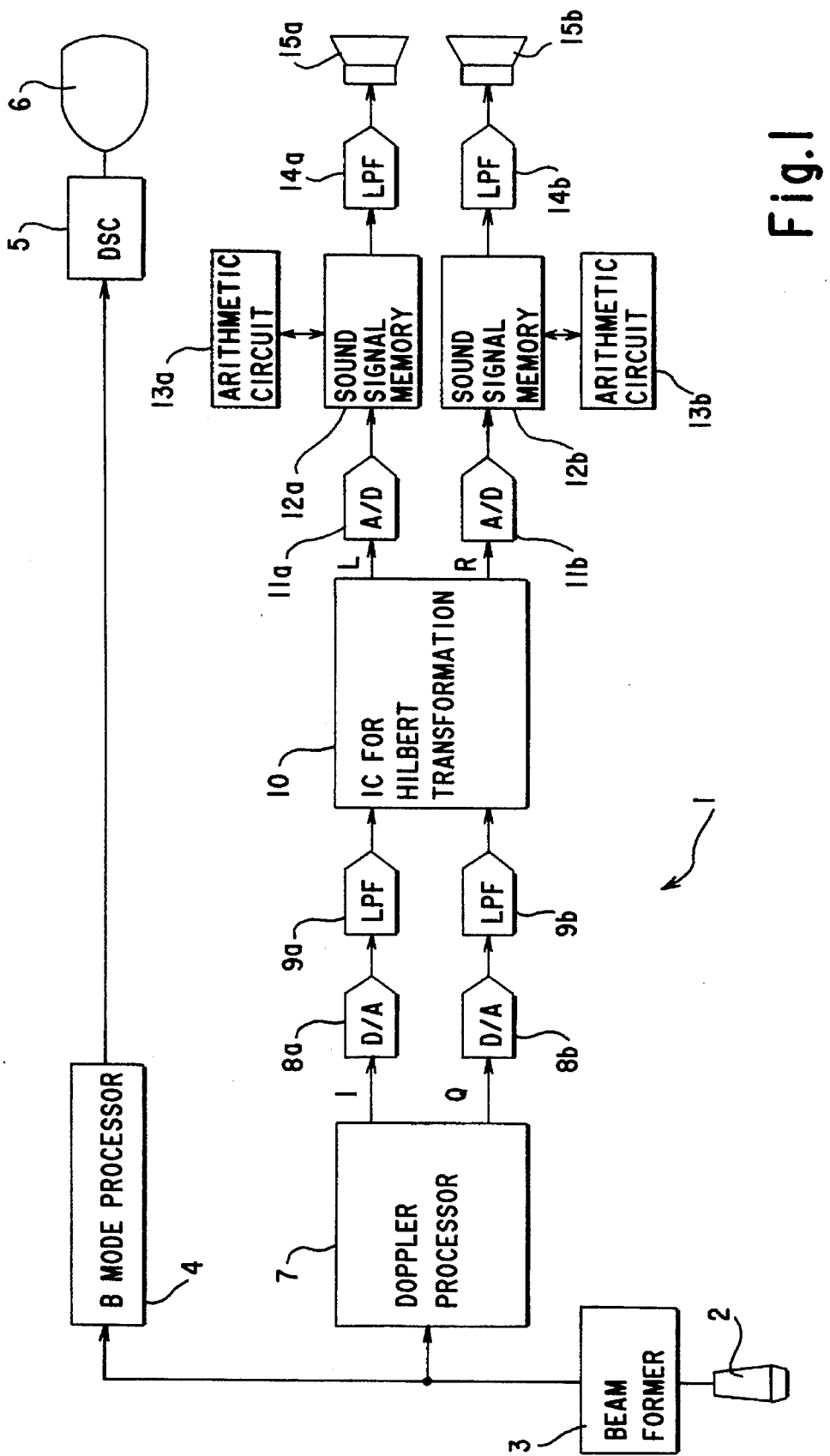
FIG. 1 is a block diagram showing an apparatus for generating Doppler sounds, according to one embodiment of the present invention.

FIG. 1 is a block diagram showing an ultrasonic diagnostic system or an apparatus for generating Doppler sounds, according to one embodiment of the present invention.

In the Doppler sound generating apparatus 1, a probe 2 and a beam former 3 transmit ultrasonic pulses in a predetermined direction at predetermined periods (=1/PRF). Further, the probe 2 and the beam former 3 receive an ultrasonic echo between the transmitted ultrasonic pulse and the subsequent transmitted ultrasonic pulse and sends the echo signal to a B mode processor 4 and a Doppler processor 7. Incidentally, the beam former 3 comprises a transmit driver, a receive amplifier and a phasing circuit for forming an ultrasonic beam to be transmitted and received.

The B mode processor 5 extracts B mode information from the echo signal and outputs it to a DSC (Digital Scan Converter) 5.

The DSC 5 generates a B mode image from the B mode information.

Further, a display 6 displays the B mode image generated from the DSC 5 thereon.

On the other hand, the Doppler processor 7 includes a phase detector circuit, an anti-area sing filter, a gating circuit, an A/D converter, a wall filter and an integrator circuit. Further, the Doppler processor 7 outputs I and Q components of a Doppler signal. Incidentally, the configuration of the Doppler processor 7 has already been known.

The I and Q components of the Doppler signal respectively pass through D/A converters 8a and 8b and LPFs (Low Pass Filters) 9a and 9b so as to be inputted to an IC 10 for Hilbert transformation.

The IC 10 for Hilbert transformation converts the I and Q components of the Doppler signal into left and right sound signals L and R respectively. Now, the left sound signal L represents the flow of blood in a direction of approaching the ultrasonic probe 2, whereas the right sound signal R represents the flow of blood in a direction of being spaced away from the ultrasonic probe 2.

The left and right sound signals L and R respectively pass through A/D converters 11a and 11b so as to be stored in sound signal memories 12a and 12b.

Since the left and right sound signals L and R are sequential or continuous when the mode is of a normal pulse Doppler mode, they are respectively read from the sound signal memories 12a and 12b as they are. Thereafter, the read left and right sound signals L and R are respectively sent to sound output devices 15a and 15b through the LPFs 14a and 14b so as to be outputted as voices or sounds. At this time, arithmetic circuits 13a and 13b remain deactivated.

In each of segmented Doppler modes, a pulse Doppler mode (D mode) of 20 ms, for example, and a B mode of 17 ms, for example, are alternately executed as shown in FIG. 2(a). Therefore, the left and right sound signals L and R become intermittent and hence they cannot be outputted as the Doppler sounds so long as they remain intact.

Thus, the arithmetic circuits 13a and 13b make the left and right sound signals L and R continuous in order of the following terms (1) to (4).

(1) As shown in FIG. 2(b), segmented waveforms 21, 22 and 23, which are interposed between adjacent zero cross points of sound signals (L, R) produced during a single D mode period, are taken out so as to create positive-side segmented waveforms 21p, 22p and 23p obtained by rendering the signs of the segmented waveforms 21, 22 and 23 positive and negative-side segmented waveforms 21n, 22n and 23n obtained by rendering the signs thereof negative.

(2) A pair of the positive-side segmented waveform 21p and the negative-side segmented waveform 21n, a pair of the positive-side segmented waveform 22p and the negative-side segmented waveform 22n and a pair of the positive-side segmented waveform 23p and the positive-side segmented waveform 23n are rendered consecutive in order of appearance of the segmented waveforms 21, 22 and 23 to thereby create a double-lengthened sound signal W1.

(3) The above (1) to (2) are effected on the individual D mode periods to thereby create double-lengthened sound signals W2, . . . . When the overall time interval of the double-lengthened sound signal is much shorter than a time interval corresponding to the sum of the original D mode period and the next B mode period, the overall time interval is made longer by repeating the final pair of positive-side segmented waveform and negative-side segmented waveform so as to become substantially equal to the time interval corresponding to the sum of the original D mode period and the next B mode period. On the other hand, when no segmented waveforms appear in the sound signals (L, R) during a single pulse Doppler mode period, a zero signal, which lasts only for a time interval substantially equal to the time interval corresponding to the sum of the original D mode period and the next B mode period, is set as a double-lengthened sound signal as shown in FIG. 3.

(4) The respective double-lengthened sound signals W1, W2, . . . are coupled to one another.

The continuous left and right sound signals L and R are respectively written into the sound signal memories 12a and 12b. Further, they are read whenever necessary and are sent via the LPFs 14a and 14b to the sound output devices 15a and 15b from which they are outputted as the voices or sounds.

According to the Doppler sound generating apparatus 1 described above, since the respective segmented waveforms are joined to each other at the zero points, practically problem-free continuity is obtained even if windows are not run. Thus, natural Doppler sounds can be outputted in a simple structure.

Figure 4:
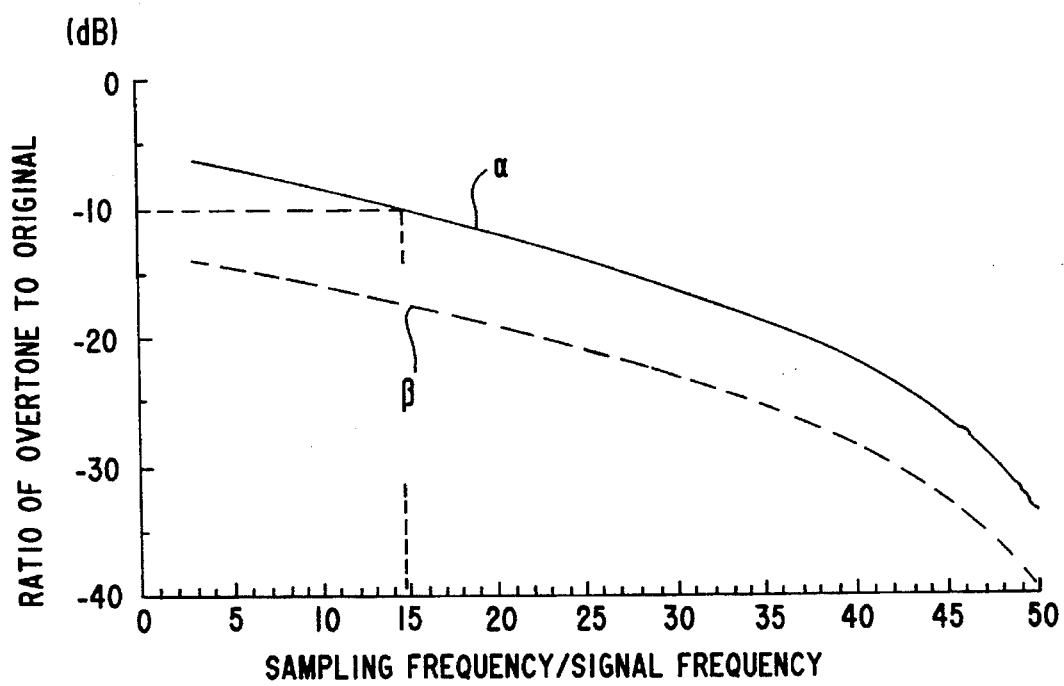
FIG. 4 is a view for describing a characteristic of a multiple tone/an original tone with respect to a sampling frequency/a Doppler signal frequency and a characteristic of a triple tone/the original tone with respect to the sampling frequency/Doppler signal frequency.
Figure 6A:
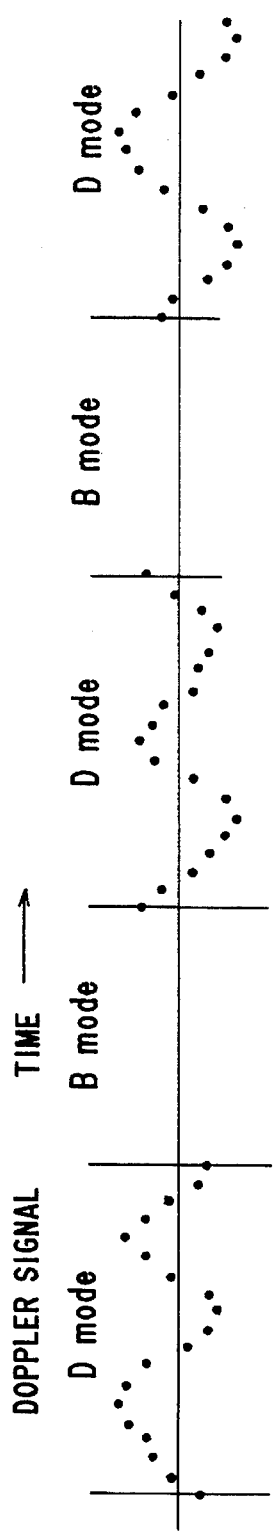
FIG. 6 is a view for describing the sequence of sound signals generated from a conventional Doppler sound generating apparatus.
Figure 6B:
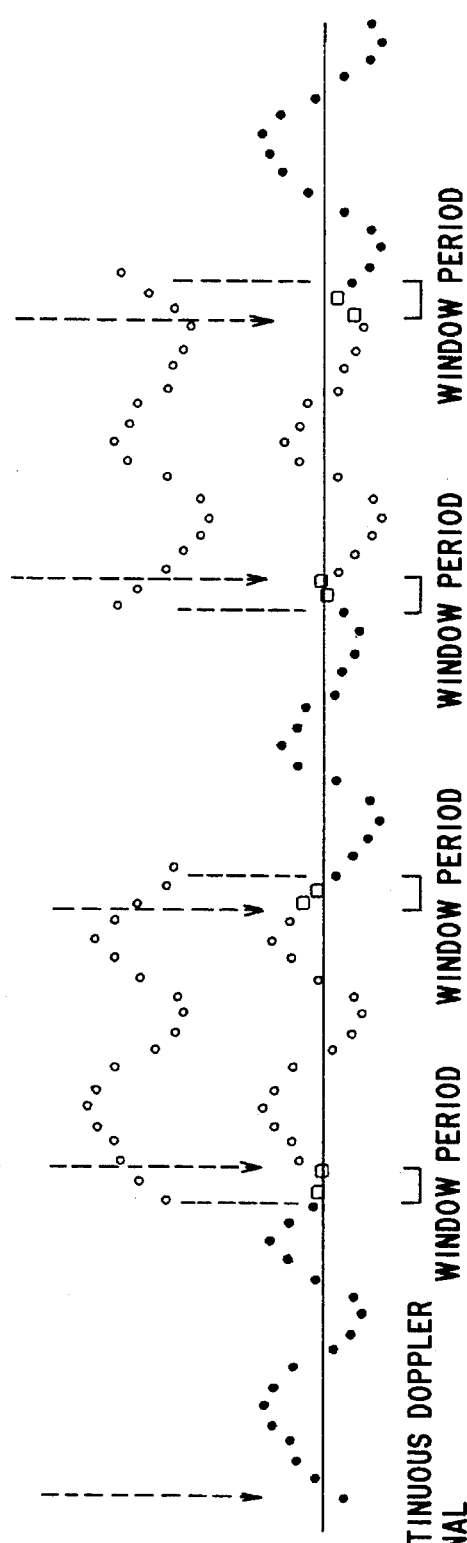

Sampling frequencies at the A/D converters 11a and 11b may be increased to improve the accuracy of joining the respective segmented waveforms to one another at the zero points. FIG. 4 shows a characteristic curve α of a multiple tone/an original tone with respect to a sampling frequency/a Doppler signal frequency and a characteristic curve β of a triple tone/the original tone with respect to the sampling frequency/Doppler signal frequency. It is understood from these characteristics that at least the sampling frequency may be greater than 15 times the Doppler signal frequency.

The reason why the sound signals are made continuous after the Hilbert transformation and the Doppler signals are not set on a continual basis before the Hilbert transformation as described above, is that since each of the sound signals is phase shifted due to its continuity, the left and right sound signals are improperly separated from each other where the sound signals are made continuous before the Hilbert transformation.

As another embodiment, may be mentioned one in which negative-side reverse segmented waveforms 21nr, 22nr 23nr, ... obtained by rendering the signs of the segmented waveforms 21, 22, 23, ... negative and inverting or reversing intervals before and after the time or time interval, are created as an alternative to the negative-side segmented waveforms 21n, 22n, 23n, ... shown in FIG. 5(b).

Since the negative-side reverse segmented waveforms are joined to one another at zero points even in this case, practically problem-free continuity can be obtained even if windows are not run. Thus, natural Doppler sounds can be outputted in a simple structure.

AS a further embodiment, may be mentioned one in which the Hilbert transformation is performed by software as an alternative to that using the D/A converters 8a, 8b, the LPFs 9a and 9b, the IC 10 for Hilbert transformation and the A/D converters 11a and 11b. Since a PRF is equivalent to a sampling frequency in this case, the accuracy of joining segmented waveforms to one another at zero points can be raised as the PRF increases.

According to a Doppler sound generating apparatus of this invention, natural Doppler sounds can be outputted in a simple structure even upon segmented Doppler modes.

We claim:

1. A method of generating Doppler sounds, wherein each of pulse Doppler modes is interrupted for a predetermined time interval to insert a B mode, thereby effecting each of segmented Doppler modes in concurrence with the pulse Doppler mode and the B mode, comprising the following steps:

converting I and Q components of a Doppler signal obtained in the pulse Doppler mode into right and left sound signals respectively;

taking out segmented waveforms interposed between zero cross points of the right and left sound signals produced during a single pulse Doppler mode period so as to create positive-side segmented waveforms obtained by rendering the signs of the segmented waveforms positive and negative-side segmented waveforms obtained by rendering the signs of the segmented waveforms negative, making respective pairs of the positive-side segmented waveforms and the negative-side segmented waveforms of the respective segmented waveforms continuous in order of appearance of the segmented waveforms so as to create double-lengthened right and left sound signals, and making the created respective double-lengthened right and left sound signals produced during the respective pulse Doppler mode periods continuous so as to create continuous right and left sound signals; and producing the Doppler sounds based on the continuous right and left sound signals.

2. A method of generating Doppler sounds, wherein each of pulse Doppler modes is interrupted for a predetermined time interval to insert a B mode, thereby effecting each of segmented Doppler modes in concurrence with the pulse Doppler mode and the B mode, comprising the following steps:

converting I and Q components of a Doppler signal obtained in the pulse Doppler mode into right and left sound signals respectively;

taking out segmented waveforms interposed between zero cross points of the right and left sound signals produced during a single pulse Doppler mode so as to create positive-side segmented waveforms obtained by rendering the signs of the segmented waveforms positive and negative-side reverse segmented waveforms obtained by rendering the signs of the segmented waveforms negative and reversing the time intervals before and after each time, making respective pairs of the positive-side segmented waveforms and the negative-side reverse segmented waveforms of the respective segmented waveforms continuous in order of appearance of the segmented waveforms so as to create double-lengthened right and left sound signals, and making the double-lengthened right and left sound signals produced during the respective pulse Doppler mode periods continuous so as to create continuous right and left sound signals; and producing the Doppler sounds based on the continuous right and left sound signals.

3. The method as claimed in claim 1 or 2, wherein when the overall time interval of either the double-lengthened right sound signal or the double-lengthened left sound signal is shorter than a time interval corresponding to the sum of the original pulse Doppler mode period and the next B mode period, the overall time interval is prolonged so as to be substantially equal to the time interval corresponding to the sum of the original pulse Doppler mode period and the next B mode period by repeating a pair of the final positive-side and negative-side segmented waveforms or a pair of the positive-side segmented waveform and the negative-side reverse segmented waveform.

4. The method as claimed in claim 1 or 2, wherein when the segmented waveforms are absent in either the right sound signal or the left sound signal produced during the single pulse Doppler mode period, a zero signal which lasts only for a time interval substantially equal to the time interval corresponding to the sum of the original pulse Doppler mode period and the next B mode period, is set as a double-lengthened right sound signal or a double-lengthened left sound signal.

5. An apparatus for generating Doppler sounds, which has segmented Doppler modes each effected in concurrence with a pulse Doppler mode and a B mode by intermitting the pulse Doppler mode for a predetermined time interval so as to insert the B mode, comprising:

Hilbert transforming means for converting I and Q components of a Doppler signal obtained in the pulse Doppler mode into right and left sound signals respectively;

sound signal storing means for storing the right and left sound signals therein;

arithmetic means for taking out segmented waveforms interposed between zero cross points of the right and left sound signals stored in said sound signal storing means and produced during a single pulse Doppler mode period so as to create positive-side segmented waveforms obtained by rendering the signs of the segmented waveforms positive and negative-side segmented waveforms obtained by rendering the signs of the segmented waveforms negative, making respective pairs of the positive-side segmented waveforms and the negative-side segmented waveforms of the respective segmented waveforms continuous in order of appearance of the segmented waveforms so as to create double-lengthened right and left sound signals and making the double-lengthened right and left sound signals produced during the respective pulse Doppler mode periods continuous so as to create continuous right and left sound signals;

right sound outputting means for outputting a Doppler sound based on the continuous right sound signal; and left sound outputting means for outputting a Doppler sound based on the continuous left sound signal.

6. An apparatus for generating Doppler sounds, which has segmented Doppler modes each effected in concurrence with a pulse Doppler mode and a B mode by intermitting the pulse Doppler mode for a predetermined time interval so as to insert the B mode, comprising:

Hilbert transforming means for converting I and Q components of a Doppler signal obtained in the pulse Doppler mode into right and left sound signals respectively;

sound signal storing means for storing the right and left sound signals therein;

arithmetic means for taking out segmented waveforms interposed between zero cross points of the right and left sound signals stored in said sound signal storing means and produced during a single pulse Doppler mode period so as to create positive-side segmented waveforms obtained by rendering the signs of the segmented waveforms positive and negative-side reverse segmented waveforms obtained by rendering the signs of the segmented waveforms negative and reversing the time intervals before and after each time, making respective pairs of the positive-side segmented waveforms and the negative-side reverse segmented waveforms of the respective segmented waveforms continuous in order of appearance of the segmented waveforms so as to create double-lengthened right and left sound signals and making the double-lengthened right and left sound signals produced during the respective pulse Doppler mode periods continuous so as to create continuous right and left sound signals;

right sound outputting means for outputting a Doppler sound based on the continuous right sound signal; and left sound outputting means for outputting a Doppler sound based on the continuous left sound signal.

7. The apparatus as claimed in claim 5 or 6, wherein said arithmetic means is activated in such a manner that when the overall time interval of either the double-lengthened right sound signal or the double-lengthened left sound signal is shorter than a time interval corresponding to the sum of the original pulse Doppler mode period and the next B mode period, the overall time interval is prolonged by repeating a pair of the final positive-side and negative-side segmented waveforms or a pair of the positive-side segmented waveform and the negative-side reverse segmented waveform to become substantially equal to the time interval corresponding to the sum of the original pulse Doppler mode period and the next B mode period.

8. The apparatus as claimed in claim 5 or 6, wherein said arithmetic means is activated in such a manner that when the segmented waveforms are absent in either the right sound signal or the left sound signal produced during the single pulse Doppler mode period, a zero signal which lasts only for a time interval substantially equal to the time interval corresponding to the sum of the original pulse Doppler mode period and the next B mode period, is set as a double-lengthened right sound signal or a double-lengthened left sound signal.

9. The method of claim 3, wherein when the segmented waveforms are absent in either the right sound signal or the left sound signal produced during the single pulse Doppler mode period, a zero signal which lasts only for a time interval substantially equal to the time interval corresponding to the sum of the original pulse Doppler mode period and the next B mode period, is set as a double-lengthened right sound signal or a double-lengthened left sound signal.

10. The apparatus of claim 7, wherein said arithmetic means is activated in such a manner that when the segmented waveforms are absent in either the right sound signal or the left sound signal produced during the single pulse Doppler mode period, a zero signal which lasts only for a time interval substantially equal to the time interval corresponding to the sum of the original pulse Doppler mode period and the next B mode period, is set as a double-lengthened right sound signal or a double-lengthened left sound signal.

* * * * *